US007601913B2

(12) United States Patent
Kim et al.

(10) Patent No.: US 7,601,913 B2
(45) Date of Patent: Oct. 13, 2009

(54) WIRE HARNESS FIXING DEVICE

(75) Inventors: Young Ryol Kim, Gwangju (KR); Seung Weon Nam, Gwangju (KR)

(73) Assignee: Samsung Gwangju Electronics Co., Ltd. (KR)

( * ) Notice: Subject to any disclaimer, the term of this patent is extended or adjusted under 35 U.S.C. 154(b) by 44 days.

(21) Appl. No.: 11/367,336

(22) Filed: Mar. 6, 2006

(65) Prior Publication Data

US 2006/0223351 A1 Oct. 5, 2006

(30) Foreign Application Priority Data

Apr. 4, 2005 (KR) ...................... 10-2005-0027901
Aug. 5, 2005 (KR) ...................... 10-2005-0071900

(51) Int. Cl.
*H02G 3/08* (2006.01)
*H01H 9/02* (2006.01)
*H01G 9/02* (2006.01)
*H01R 13/40* (2006.01)

(52) U.S. Cl. ....................... 174/58; 174/72 A; 174/481; 439/587; 248/906

(58) Field of Classification Search ................... 174/24, 174/50, 53, 57, 58, 68.1, 68.3, 72 A, 72 R, 174/72 C, 96, 135, 480, 481; 439/157, 587; 248/68.1
See application file for complete search history.

(56) References Cited

U.S. PATENT DOCUMENTS 5,044,986 A * 9/1991 Baumanis .................... 439/548
5,112,241 A * 5/1992 Chesnut et al. ............. 439/273
5,248,196 A * 9/1993 Lynn et al. .................. 312/406
5,306,195 A * 4/1994 Hayashi ...................... 439/587
6,217,381 B1 * 4/2001 Kameyama ................. 439/578
6,325,661 B1 * 12/2001 Tabata ........................ 439/459

(Continued)

FOREIGN PATENT DOCUMENTS

DE 29606772 9/1996

(Continued)

OTHER PUBLICATIONS

Translation of DE29606772.*

(Continued)

*Primary Examiner*—Diego Gutierrez
*Assistant Examiner*—David M Sinclair
(74) *Attorney, Agent, or Firm*—Blank Rome LLP

(57) ABSTRACT

A wire harness fixing device designed to enable convenient installation thereof within an inner liner of a refrigerator while effectively preventing leakage of a foam insulation material filled between the inner liner and an outer liner of the refrigerator. The wire harness fixing device includes a housing including an insert part provided at one end of the housing and inserted through a fixing hole formed in the inner liner, and an interior part positioned at the other end within the inner liner. A latch is provided on the insert part that engages an outer surface of the inner liner at the fixing hole when the insert part is inserted into the fixing hole, and a cover of a flexible material integrally formed to the housing at the interior part side to cover the fixing hole, the cover being subjected to elastic deformation to closely contact an inner surface of the inner liner at the fixing hole side when the latch is latched to and supported by the inner liner.

9 Claims, 13 Drawing Sheets

U.S. PATENT DOCUMENTS

| | | | | |
|---|---|---|---|---|
| 7,045,715 | B2 * | 5/2006 | Ono | 174/72 A |
| 2004/0238204 | A1 | 12/2004 | Ono | |

FOREIGN PATENT DOCUMENTS

| | | | |
|---|---|---|---|
| KR | 10-2004-0025466 | A | 3/2004 |

OTHER PUBLICATIONS

Latch definition The American Heritage Dictionary of the English Language: Fourth Edition.*

Elastomer definition The American Heritage Dictionary of the English Language: Fourth Edition.*

Rubber definition The American Heritage Dictionary of the English Language: Fourth Edition.*

* cited by examiner

WIRE HARNESS FIXING DEVICE

CROSS-REFERENCE TO RELATED APPLICATION

This application claims priority under 35 U.S.C. §119 to Korean Patent Application Nos. 2005-27901 and 2005-71900, filed on Apr. 4, 2005 and Aug. 5, 2005, respectively, in the Korean Intellectual Property Office, the disclosure of which is incorporated herein by reference.

FIELD OF THE INVENTION

The present invention relates to a wire harness fixing device, and, more particularly, to a wire harness fixing device designed to enable convenient installation thereof within an inner liner of a refrigerator while effectively preventing leakage of a foam insulation material filled between the inner liner and an outer liner of the refrigerator.

BACKGROUND OF THE INVENTION

Generally, a refrigerator includes a foam insulation material filled to form an insulation layer between an inner liner constituting an inner wall of a storage room and an outer liner constituting an outer wall of a body, and a wire harness provided through the insulation layer, through which several electric and electronic components of the refrigerator, including various sensors and switches, are electrically connected to a controller or a power source.

The inner liner is often equipped with a fixing device to support the wire harness thereto. The wire harness can be connected to the controller or the power source. With one end thereof inserted in the inner liner, the fixing device is held by the foam insulation material between the outer and inner liners.

Such a conventional wire harness fixing device includes a housing, which has one end inserted into a fixing hole formed in the inner liner and allows electric lines or wires provided between the inner and outer liners to pass through the housing, and a housing cover, which typically has a shielding portion that surrounds the housing for shielding the fixing hole to prevent leakage of the foam insulation.

However, with such a conventional wire harness fixing device, the foam insulation material can easily leak to the outside of the inner liner through gaps between the housing and the housing cover or through gaps between the shielding portion and the inner liner, which are separately provided, when filling the space between the inner and outer liners with the foam insulation material. Thus, in order to prevent leakage of the foam insulation material, tapes or adhesives, such as hot-melt, are used to seal the gaps between the housing and the housing cover or the gap between the shielding portion and the inner liner. A resilient holder is often mounted to an outer surface of the housing cover to force the housing cover into close contact with the housing. As such, conventional wire harness fixing devices are difficult to assemble and install due to the adhesives and the resilient holder.

SUMMARY OF THE INVENTION

The present invention has been made in view of the above and other problems, and an aspect of the present invention is to provide a wire harness fixing device designed to enable convenient installation thereof within an inner liner of a refrigerator while effectively preventing leakage of the foam insulation material between the inner liner and an outer liner of the refrigerator.

Additional aspects and/or advantages of the invention will be set forth in part in the description which follows and, in part, will be obvious from the description, or may be learned by practice of the invention.

In accordance with one aspect of the present invention, a wire harness fixing device for fixing a wire harness in an inner liner of a refrigerator includes a housing comprising an insert part provided at one end of the housing and received in a fixing hole formed in the inner liner, and an interior part provided at the other end of the housing within the inner liner; a pair of latches extending from the insert part such that the latches are engaged by an outer surface of the inner liner at the fixing hole when the insert part is inserted to the fixing hole; and a cover of a flexible material integrally formed to the housing at the interior part side to cover the fixing hole, the cover elastically deformating in close contact with an inner surface of the inner liner at the fixing hole when the latches are latched to the inner liner.

The cover may extend radially at a predetermined angle from an outer surface of the interior part towards the insert part, and be tapered such that, as the cover approaches from the interior part to the insert part, a distance between an outer periphery of the cover and the outer surface of the housing is gradually increased.

Each of the latches may comprise a body, and a latching jaw formed at a distal end of the body such that the latching jaw is latched to the outer surface of the inner liner at the fixing hole side, the latching jaw being positioned inside a distal end of the cover at the insert part side before the cover is elastically deformed.

Each of the latches may comprise a body, and a latching jaw formed at a distal end of the body such that the latching jaw is latched to and held by the outer surface of the inner liner at the fixing hole side, a distance between the latching jaw and a distal end of the cover being smaller than the thickness of the inner liner before the cover is elastically deformed.

Each of the latches may comprise a body, and a latching jaw formed at a distal end of the body such that the latching jaw is latched to and held by the outer surface of the inner liner at the fixing hole side, the latching jaw comprising a latching portion latched to the outer surface of the inner liner at the fixing hole side, and a holding portion formed inside the latching portion such that the latching jaw is elastically held by the fixing hole.

The wire harness fixing device may further comprise a cap member coupled at one end thereof to the interior part to cover the other end of the housing inside the inner liner and having a withdrawal port formed at the other end to withdraw the wire harness. The cap member includes a hollow cap body communicating with an interior of the housing while being coupled at one end to the interior part, an open portion formed at one side of the cap body, and a pair of hinge couplers hingably provided to the cap body at both sides of the open portion, respectively, such that the hinge couplers are pivoted towards the open portion, and engage each other to define the withdrawal port between the hinge couplers while covering the open portion with the hinge couplers.

The hinge couplers and the cap body may be integrally formed by injection molding, and the cap member may further comprising narrow sections of a thin thickness formed between each hinge coupler and the body such that the hinge couplers are be hinged at both sides of the open portion.

The cap member may be coupled to the housing such that the end of the interior part is inserted into one end of the cap member. The housing may comprise a housing-side tongue and groove joint formed on an outer edge of the end of the interior part, and the cap member may comprise cap member-side tongue and groove joints formed on an inner edge of the end of the cap member such that the housing-side tongue and groove joint engages with the cap member-side tongue and groove joints. The cap member-side tongue and groove joints may comprise a first tongue and groove joint formed on the cap body, and a second tongue and groove joint formed on the hinge couplers.

The end of the interior part may slide into the one end of the cap member such that the housing-side tongue and groove joint is coupled to the first tongue and groove joint through the open portion in a state wherein the hinge couplers are pivoted to the outside of the open portion, the housing-side tongue and groove joint, and the first tongue and groove joint having insertion protrusions and insertion grooves formed thereon to engage with each other, respectively.

Each of the hinge couplers may have a first latching protrusion formed thereon, and the cap body may have a first latching hole formed thereon such that the hinge couplers are coupled to the cap body when the hinge couplers are pivoted towards the open portion, and each of the hinge couplers may have a pair of second latching protrusions, and a pair of second latching holes such that the pair of second latching protrusions are coupled to the pair of second latching holes when the hinge couplers are pivoted towards the open portion.

The wire harness fixing device may further comprise a sealing member on an inner surface of each hinge coupler at the withdrawal port side to enhance closing force between the withdrawal port and the wire harness.

In accordance with another aspect of the present invention, a wire harness fixing device for fixing a wire harness in an inner liner of a refrigerator that includes a housing to receive wire harness terminals inserted thereto, the housing having one end inserted and fixed to a fixing hole formed in an inner liner; a cover of a flexible material integrally formed to a middle portion of the housing to cover the fixing hole; and a cap member to cover the other end of the housing inside the inner liner, the cap member comprising a pair of hinge couplers provided at both sides of an open portion formed at one side of the housing to define a withdrawal port for withdrawing of the wire harness when the hinge couplers are pivoted from both sides of the open portion, and coupled to each other to cover the open portion.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
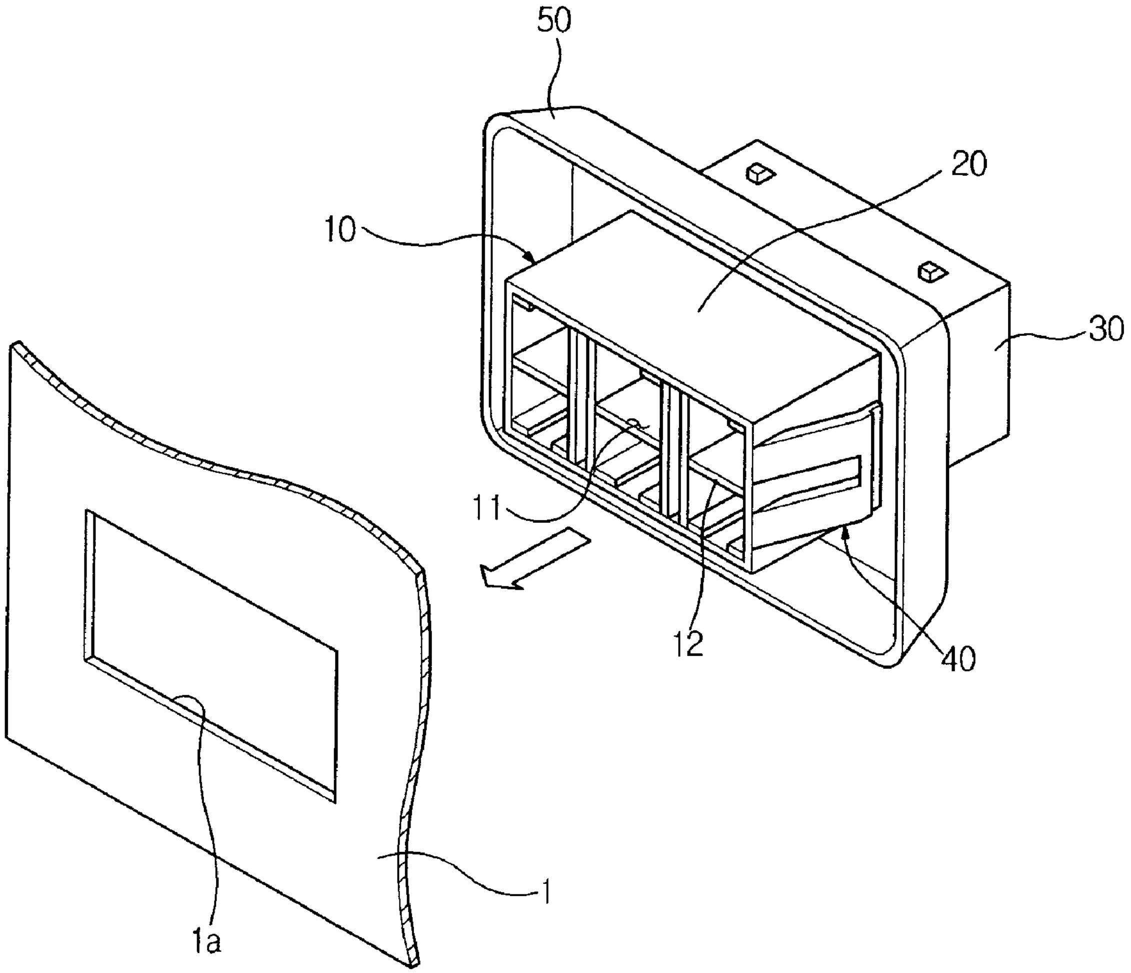
FIG. 1 is an exploded perspective view of a wire harness fixing device in accordance with one embodiment of the present invention.

Reference will now be made in detail to the embodiments of the present invention, examples of which are illustrated in the accompanying drawings. The embodiments are described below to explain the present invention by referring to the accompanying drawings.

A wire harness fixing device according to one embodiment of the present invention serves to fix a wire harness 3 (FIG. 2) positioned in a space between an inner liner 1 and an outer liner 2 of a refrigerator to the inner liner 1. As shown in FIGS. 1 to 7, the wire harness fixing device comprises a parallelepiped housing 10, which can be produced by injected molding, and includes a through hole 11 (FIG. 1) formed therein to receive a plurality of electric lines or wires 3*a*.

The through hole 11 is formed with a plurality of partition plates 12 by which the electric lines 3*a* are divided, and then received in the housing 10. The electric lines 3*a* extend though the space between the inner liner 1 and the outer liner 2 of the refrigerator, so that electric and electronic components of the refrigerator, such as various sensors and switches, can be electrically connected to a controller or a power source.

The housing 10 comprises an insert part 20 which constitutes one end of the housing 10 and is inserted into a fixing hole 1*a* formed in the inner liner 1, and an interior part 30 which constitutes the other end of the housing 10. The housing 10 is held in the fixing hole 1*a* of the inner liner 1 by a foam insulation material 4 (FIG. 6) foamed in a space between the outer liner 2 and the inner liner 1 for thermal insulation for the refrigerator. The wire harness 3 is also firmly fixed in the space between the inner liner 1 and the outer liner 2 by the foam insulation material 4 filled therein.

Figure 2:
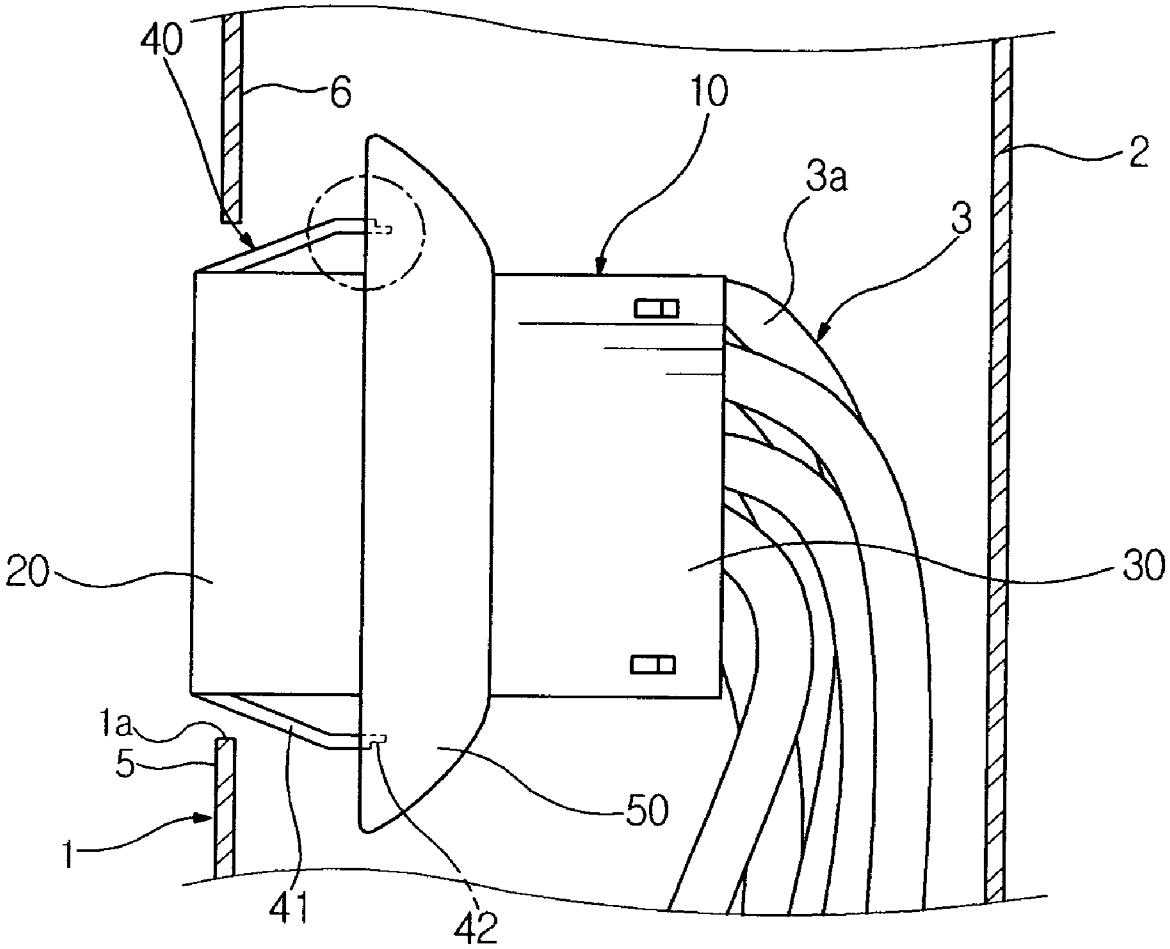
FIG. 2 is an elevational view of the wire harness fixing device in section, showing a housing of the device before it is inserted into a fixing hole of an inner liner of a refrigerator.
Figure 3:
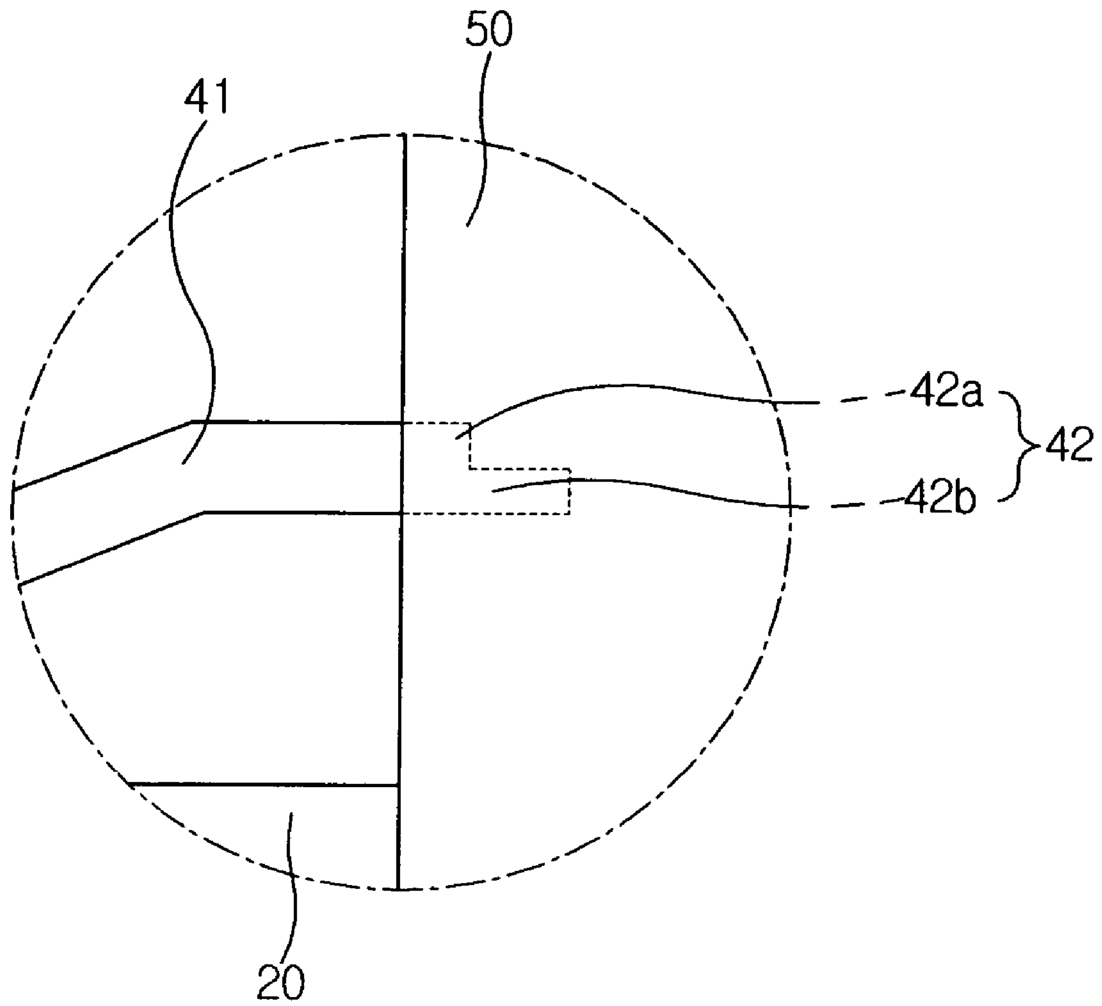
FIG. 3 is a partial enlarged elevational view of the wire harness fixing device illustrated in FIG. 2.
Figure 4:
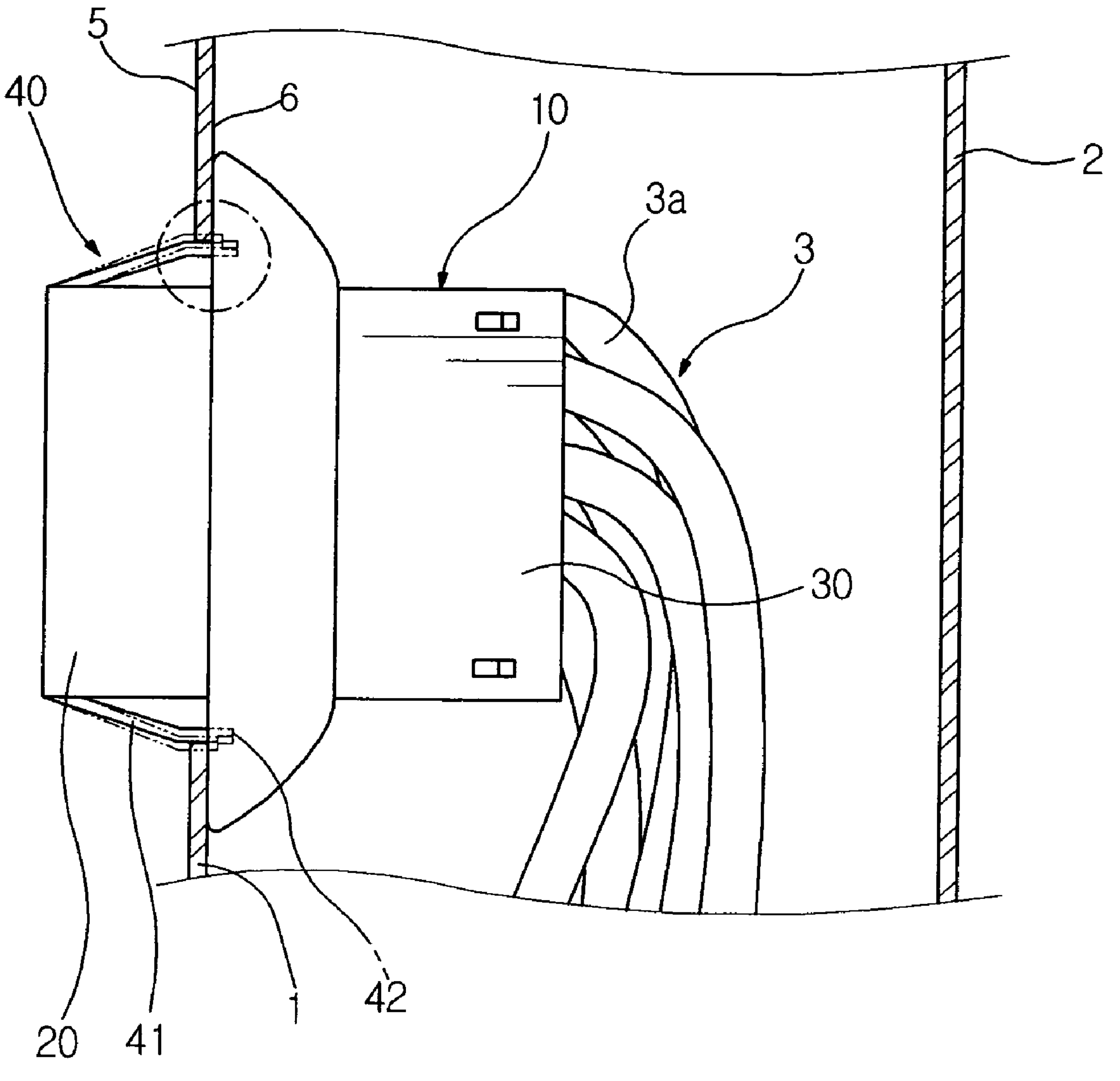
FIG. 4 is an elevational view of the wire harness fixing device, showing the housing of the device inserted into the fixing hole of the inner liner of a refrigerator.
Figure 5:
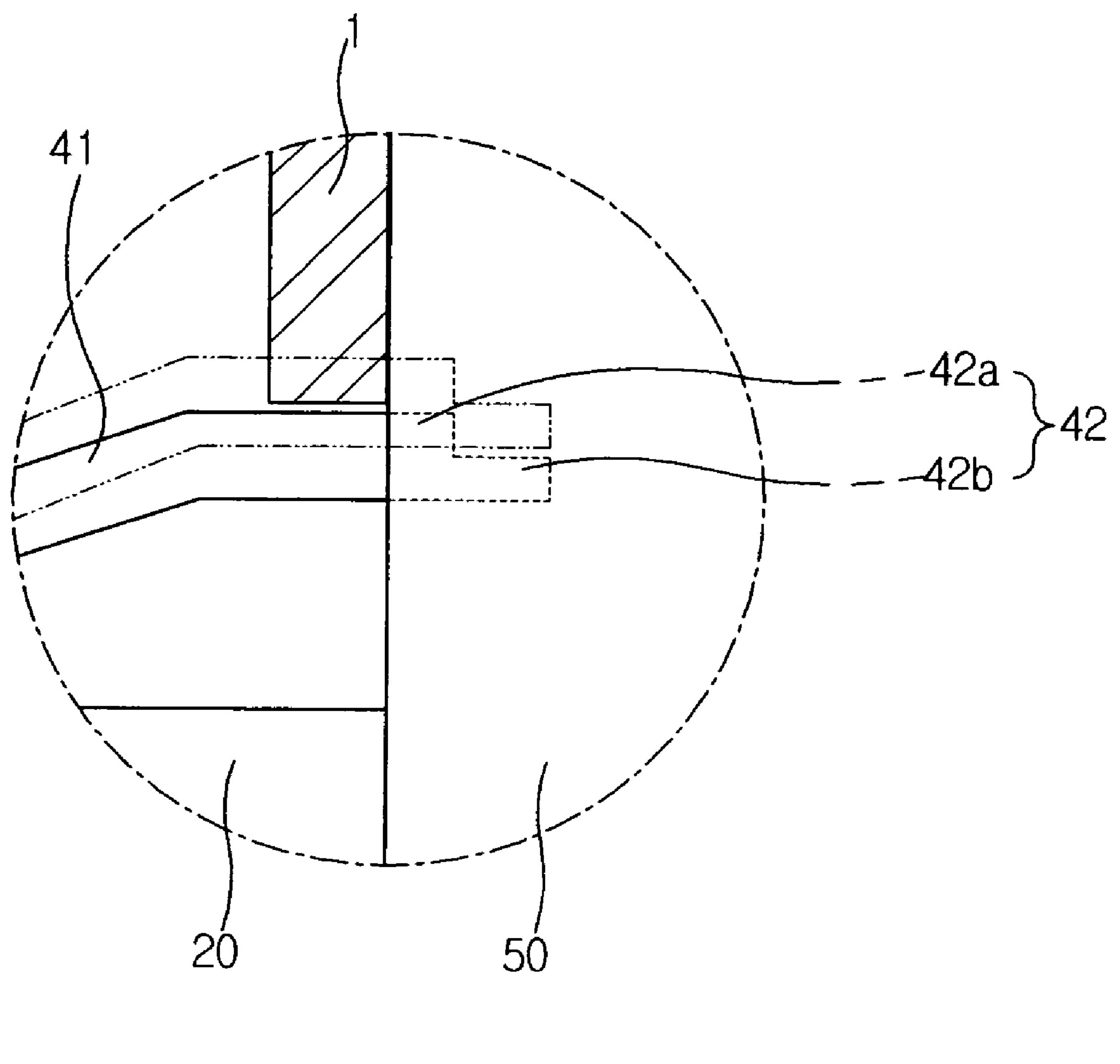
FIG. 5 is a partial enlarged elevational view of the wire harness fixing device illustrated in FIG. 4.

In order to hold the housing 10 in the fixing hole 1*a* of the inner liner 1 before the foam insulation material 4 is filled in the space, the insert part 20 has a pair of resilient latches 40 respectively formed on opposite sides of the insert part 20. As seen in FIG. 2, each of the latches 40 comprises a body 41 which is bent and extends a predetermined distance from a leading end of the insert part 20 towards the interior part 30 such that the body 41 is separated from an outer surface of the insert part 20, and a latching jaw 42 formed at a distal end of the body 41. The latching jaw 42 latches to an outer surface 5 of the inner liner 1 at the fixing hole 1*a* side, as seen in FIG. 7.

The latching jaw 42 comprises a latching portion 42*a* and a holding portion 42*b* formed inside the latching portion 42*a*. As shown in FIGS. 4 to 7, the distance between the latching jaws 42 is greater by a predetermined distance than a corresponding width of the fixing hole 1*a* such that, when the insert part 20 of the housing 10 is inserted into the fixing hole 1*a*, it snaps into place. The holding portion 42*b* of each latch 40 is resiliently held by the fixing hole 1*a*, and the latching portion 42*a* abuts the outer surface 5 of the inner liner 1.

The wire harness fixing device further comprises a cover 50 (FIGS. 1 and 2) of a flexible material, such as rubber, which is between the interior part 30 and the insert part 20. The cover 50 covers the fixing hole 1*a* to prevent the foam insulation material from leaking to the outside of the inner liner 1 through a gap between the housing 10 and the fixing hole 1*a*. The cover 50 can be integrally formed to the housing 10 through injection molding to eliminate assembly of the cover 50 to the outer surface of the housing 10 through an additional fixing operation and to prevent a gap from being created between the cover 50 and the housing 10. By integrally forming the cover 50 with the housing 10, the step of assembling the cover to the housing is eliminated, and leakage of the foam insulation material through the gap between the housing and the cover is substantially prevented.

Figure 6:
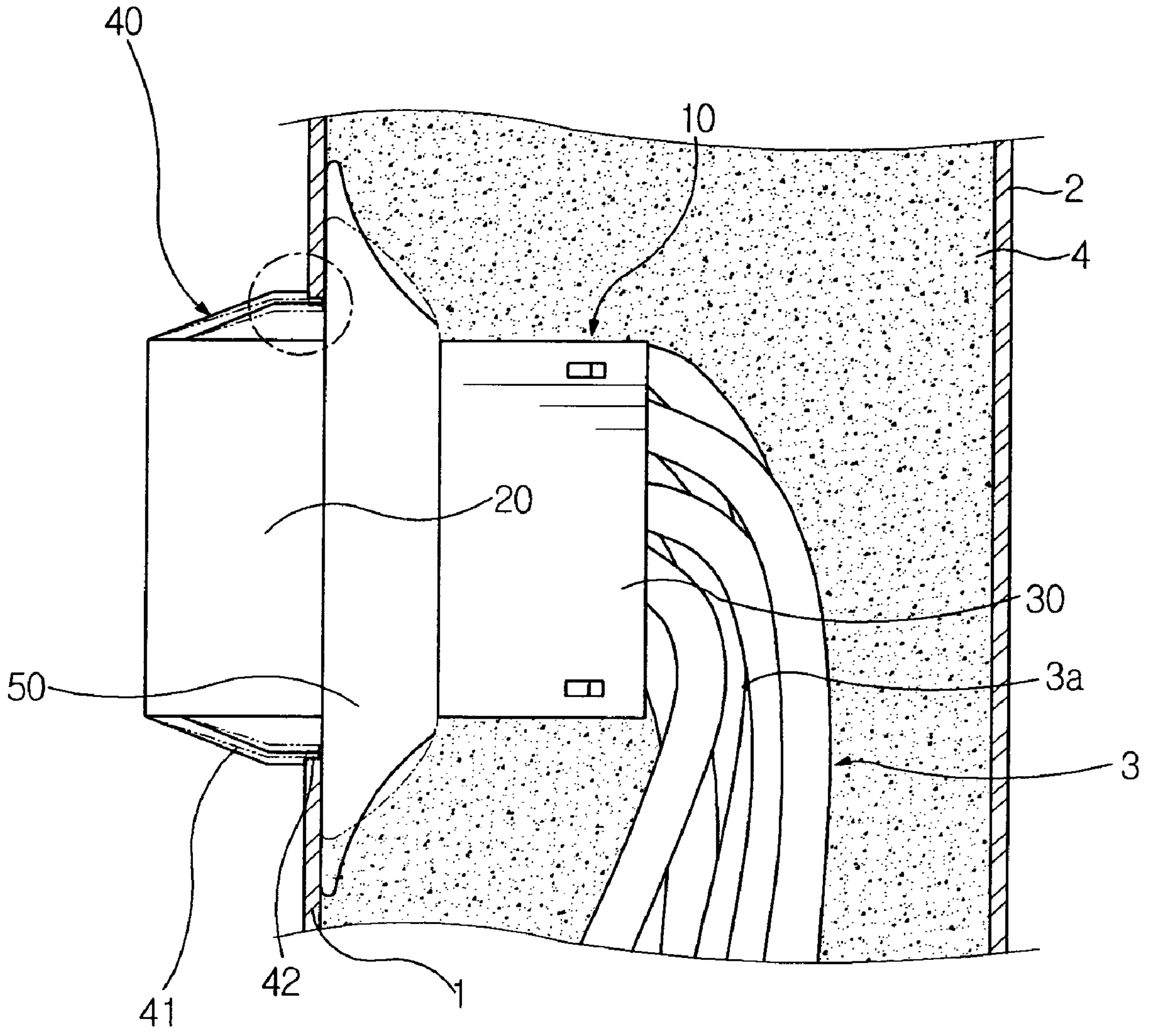
FIG. 6 is an elevational view of the wire harness fixing device, showing a foam insulation material between the inner liner and an outer liner with the housing of the device being inserted into the fixing hole of the inner liner.
Figure 7:
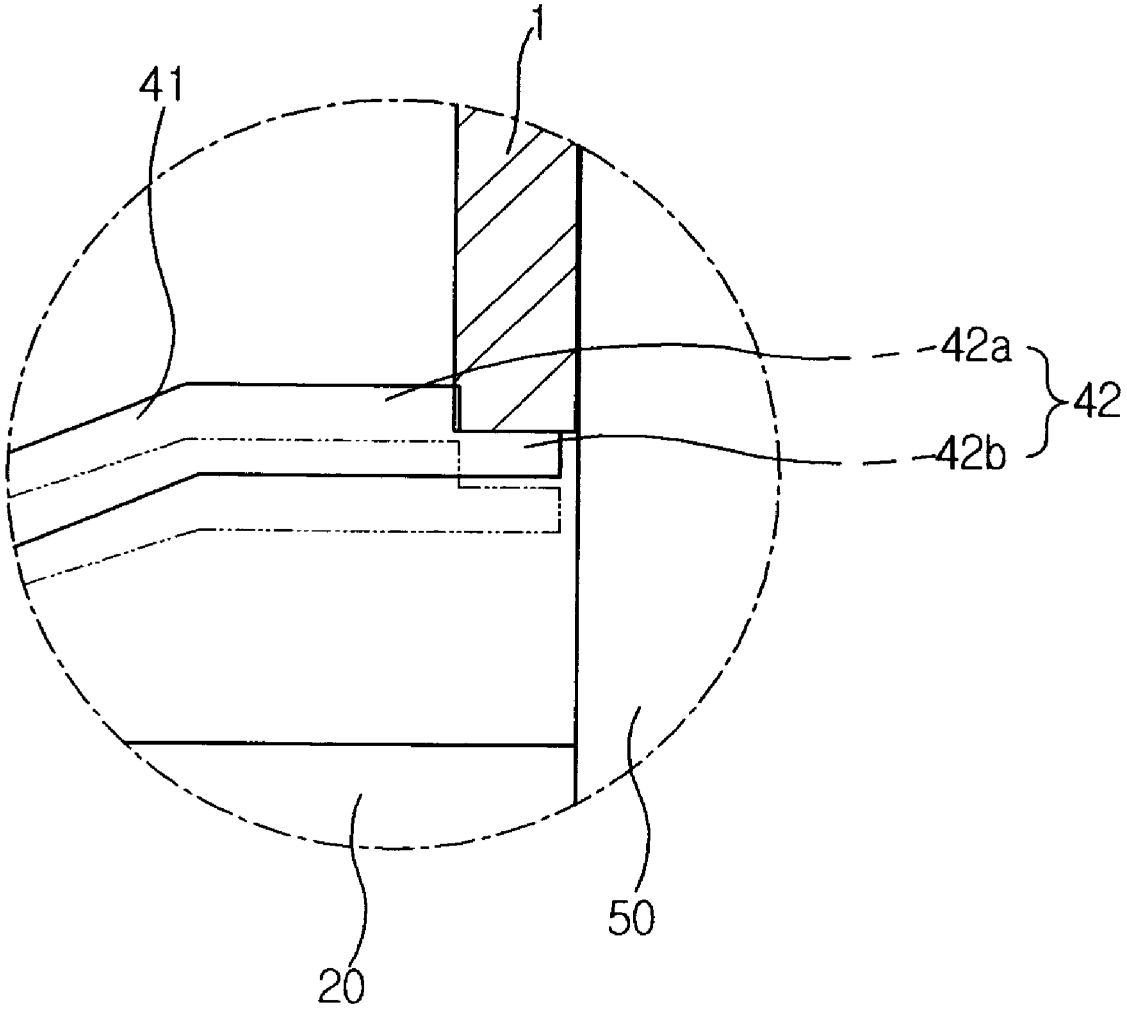
FIG. 7 is a partial enlarged elevational view of the wire harness fixing device illustrated in FIG. 6.
Figure 8:
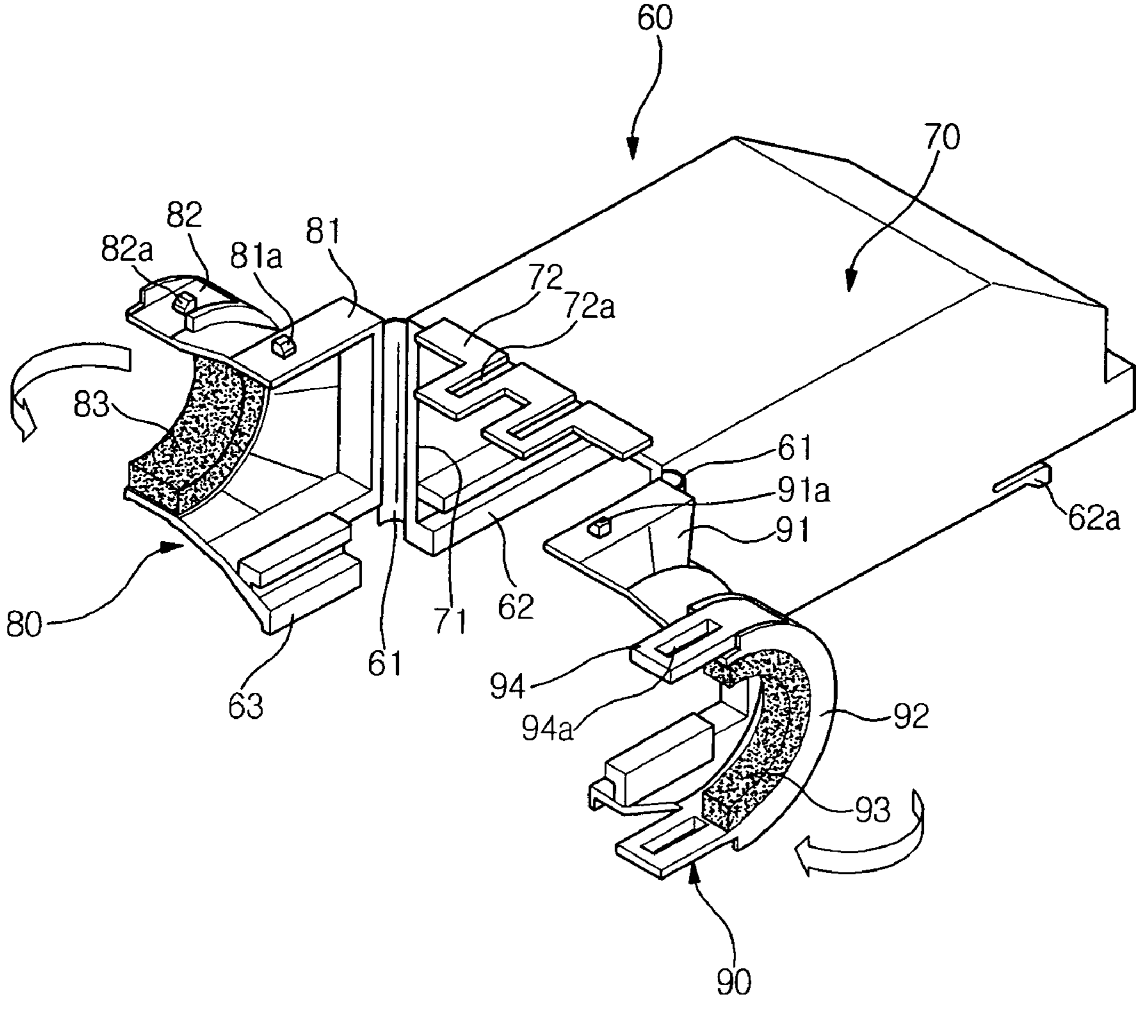
FIG. 8 is a perspective view of a cap member of a wire harness fixing device in accordance with another embodiment of the present invention.
Figure 9:
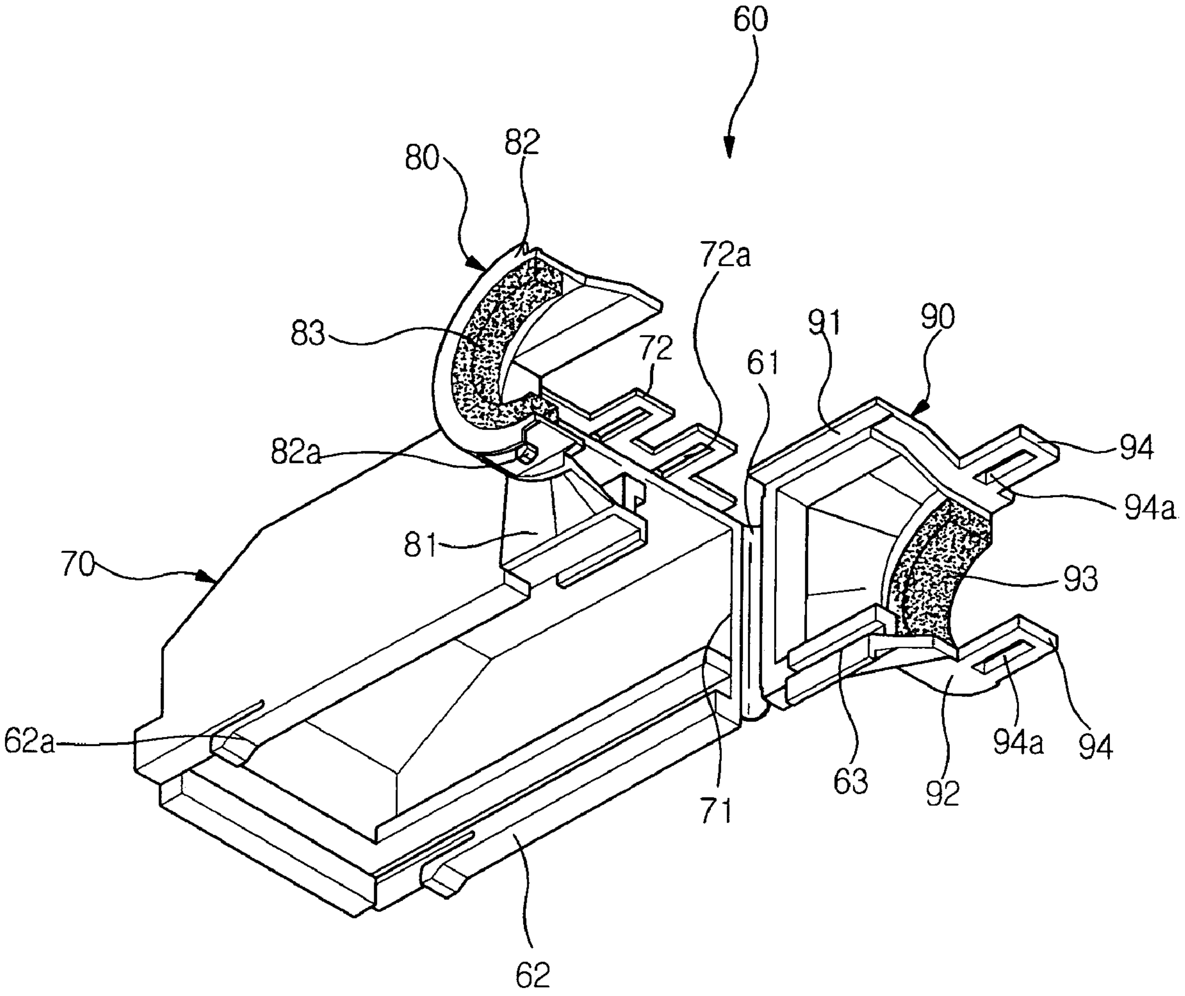
FIG. 9 is a rear perspective view of the cap member of the wire harness fixing device in accordance with another embodiment.

In addition, as clearly shown in FIGS. 6 and 7, the cover 50 is elastically deformed, and brought into close contact with an inner surface 6 of the inner liner 1 at the fixing hole 1*a* side as the latches 40 are latched to and held by the outer surface 5 of the inner liner 1 via the latching jaws 42. As a result, when the housing 10 is inserted into the fixing hole 1*a*, the cover 50 is elastically deformed, and is closely held to the inner surface 6 of the inner liner 1, so that the fixing hole 1*a* is closed by the cover 50. Thus, it is possible to prevent leakage of the foam insulation material 4 through the gap between the cover 50 and the inner liner 1 with the closing force of the cover 50 without bonding the cover 50 to the inner liner 1 at the fixing hole 1*a*, such as by use of tapes or abrasives.

Accordingly, the wire harness fixing device according to this embodiment can be easily mounted to the inner liner 1 of the refrigerator while effectively preventing the leakage of the foam insulation material 4 by the cover 50, which can be integrally formed to the housing 10 to prevent a gap from being formed therebetween, and is elastically deformed to cover the fixing hole 1*a* while closely contacting the inner surface of the inner liner 1.

Specifically, the cover 50 extends radially at a predetermined angle from an outer surface of the interior part 30 towards the insert part 20, and is tapered such that, as it approaches from the interior part 30 to the insert part 20, the distance between an outer periphery of the cover 50 and the outer surface of the housing 10 gradually increases. With this structure, the cover 50 is elastically deformed to a naturally expanded state, as it is compressed towards the inner liner 1 and is supported by the inner surface 6 of the inner liner 1 at the fixing hole 1*a*. In addition, as shown in FIGS. 1 to 5, the latches 40 are arranged such that each latching jaw 42 is positioned inside an end of the cover 50 at the insert part 20 side before the cover 50 closely contacts the inner surface 6 of the inner liner 1 when elastically deformed, as seen in FIG. 6. Accordingly, when each latching portion 42*a* is held by the outer surface 5 of the inner liner 1 the width of the cover 50 elastically deforms to closely contact the inner surface 6 of the inner liner 1 can be secured by a length of the latching jaw 42 inserted to the cover 50.

In the case where the inner liner 1 is thick so that the latching jaw 42 could separate from the end of the cover 50 before the cover 50 closely contacts the inner surface 6 of the inner liner 1 while being elastically deformed, it is preferable that the distance between the latching jaw 42 and the end of the cover 50 be smaller than the thickness of the inner liner 1. The width of the cover 50 elastically deforms to closely contact the inner surface 6 of the inner liner 1 and can be secured by a length obtained by subtracting the thickness of the inner liner 1 from the distance between the latching jaw 42 and the cover 50.

Referring to FIGS. 8 to 13, a wire harness fixing device according to another embodiment of the invention is shown, prevents the leakage of the foam insulation material 4 through the gap between the through hole 11 of the housing 10 and the wire harness 3 as well as the leakage through the gap between the fixing hole 1*a* of the inner liner 1 and the housing 10. The construction of the wire harness fixing device according to another embodiment will be described in detail hereinafter in terms of different construction from that of the above embodiment.

The wire harness fixing device of the present embodiment further comprises a cap member 60 to cover the end of the housing 10 inside the inner liner 1 in order to prevent the leakage of the foam insulation material 4 through the gap between the through hole 11 of the housing 10 and the wire harness 3 when the foam insulation material 4 is filled in the space between the inner liner 1 and the outer liner 2.

As shown in FIGS. 8 to 13, the cap member 60 comprises a cap body 70 coupled to the housing 10, and a pair of hinge couplers 80 and 90 at one side of the cap body 70 for withdrawal of the wire harness 3.

The cap body 70 has a hollow structure which communicates with the through hole 11 of the housing 10. One end of the cap body 70 is open to engage with an end of the interior part 30 of the housing 10. The cap body 70 has an open portion 71 formed at the other end thereof.

The pair of hinge couplers 80 and 90 are hingably provided on the cap body 70 at both sides of the open portion 71, respectively. The hinge couplers 80 and 90 are pivoted towards the open portion 71, and engage with each other to cover the open portion 71 while defining a withdrawal port 100 (FIG. 13) therebetween for withdrawal of the wire harness 3. By pivoting the respective hinge couplers 80 and 90 towards the open portion 71 and engaging them with each other, the withdrawn port 100 is defined around the wire harness 3. The wire harness 3 can be easily withdrawn to the outside without deterioration in closing force of the cap member 60.

Each hinge coupler 80 and 90 comprises a closing portion 81 and 91 to close an outer side of the open portion 71 near the withdrawal port 100 when the hinge couplers 80 and 90 engage with each other, and a withdrawal port defining portion 82 and 92 of a semi-cylindrical shape to form the withdrawal port 100 of a cylindrical shape at a center of the open portion 71 when the hinge couplers 80 and 90 engage with each other. Soft sealing members 83 and 93, such as a sponge, at an inner surface of the withdrawal port defining portions 82 and 92 assist in preventing the leakage of the foam insulation material through gaps between the withdrawal port 100 and the wire harness 3 by increasing the closing force between the withdrawal port 100 and the wire harness 3.

The closing portions 81 and 91 have first latching protrusions 81*a* and 91*a* formed on an upper end thereof to join the hinge couplers 80 and 90 to the cap body 70. Corresponding to the first latching protrusions 81*a* and 91*a*, the cap body 70 is provided at an upper end of the open portion 71 with a first extension 72, which extends a predetermined length towards the front side of the open portion 71 such that a pair of first latching holes 72*a* are formed in the first extension 72 to allow the respective first latching protrusions 81*a* and 91*a* to be latched thereto when the respective hinge couplers 80 and 90 are closed. In order to engage the hinge couplers 80 and 90 with each other in the closed position, one of the withdrawal port defining portions 82 and 92, for example, the withdrawal port defining portion 82 of the hinge coupler 80 can have a second latching protrusions 82*a* formed on upper and lower ends of the withdrawal port defining portion 82, respectively. In addition, the other withdrawal port defining portion 92 can have a second extensions 94, which extends a predetermined length from upper and lower ends of the withdrawal port defining portion 92, and second latching holes 94*a* respectively formed therein to receive the respective second latching protrusions 82*a*.

The cap member 60 including the hinge couplers 80 and 90 and the cap body 70 can be integrally formed by injection molding. The cap member 60 has narrow sections 61, which have a thin thickness to maintain flexibility, and are formed between each hinge coupler 80 or 90 and the cap body 70 such that the hinge couplers 80 and 90 can be hinged at both sides of the open portion 71. The cap member 60 is coupled to the housing 10 such that the end of the interior part 30 of the housing 10 is inserted into the cap member 60 via the open end of the cap body 70. A housing-side tongue and groove joint 15 is formed on an outer edge of the end of the interior part 30 of the housing 10, and cap member-side tongue and groove joints 62 and 63 are formed on an inner edge of the end of the cap member 60 such that the housing-side tongue and groove joint 15 engages with the cap member-side tongue and groove joints 62 and 63 in order to prevent the foam insulation material 4 from leaking through the gap between the cap member 60 and the housing 10. The cap member-side tongue and groove joints 62 and 63 consist of a first tongue and groove joint 62 formed on inner edges of the cap body 70, and a second tongue and groove joint 63 formed on the closing portions 81 and 91 of the respective hinge couplers 80 and 90 corresponding to the open portion 71.

Thus, when the end of the interior part 30 of the housing 10 slides into the open end of the cap body 70 via the open portion 71 with the hinge couplers 80 and 90 being pivoted open, the housing-side tongue and groove joint 15 engages with the first tongue and groove joint 62 excluding the open portion 71 side. Then, when the first latching protrusions 81*a* and 91*a* are latched to the first latching holes 72*a* by pivoting the respective hinge couplers 80 and 90 closed, the second tongue and groove joint 63 formed on the inner edge of the closing portions 81 and 92 of the hinge couplers 80 and 90 engages the housing-side tongue and groove joint 15 at the open portion 71 side, whereby an engaging portion between the cap member 60 and the housing 10 is completely closed.

To prevent separation between the housing-side tongue and groove joint 15 and the first tongue and groove joint 62, due to sliding of the cap member 60 in an opposite direction to the open portion 71 before the hinge couplers 80 and 90 are closed, insertion protrusions 62*a* are formed on both sides of the first tongue and groove joint 62, and insertion grooves 15*a* are formed on both sides of the housing-side tongue and groove joint 15 corresponding to both sides of the first tongue and groove joint 62 so as to engage with each other. Additional insertion grooves can be formed in the housing-side tongue and groove joint 15 at an opposite side for sliding engagement of the cap member 60 in the opposite direction of the housing 10.

An assembling process of the wire harness fixing device according to the present invention to the inner liner of the refrigerator will be described in detail with reference to the accompanying drawings.

Figure 10:
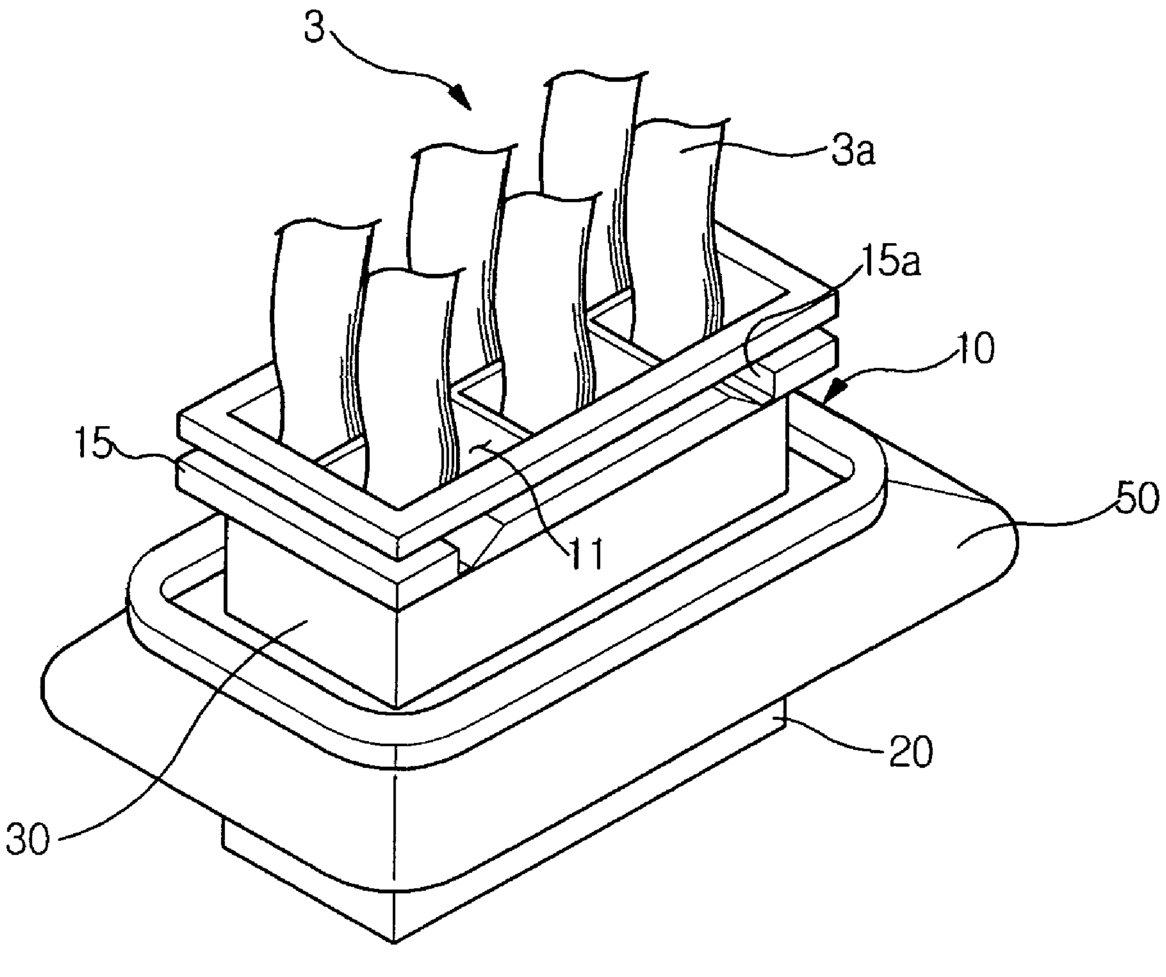
FIG. 10 is a perspective view of a housing of the wire harness fixing device in accordance with another embodiment.
Figure 11:
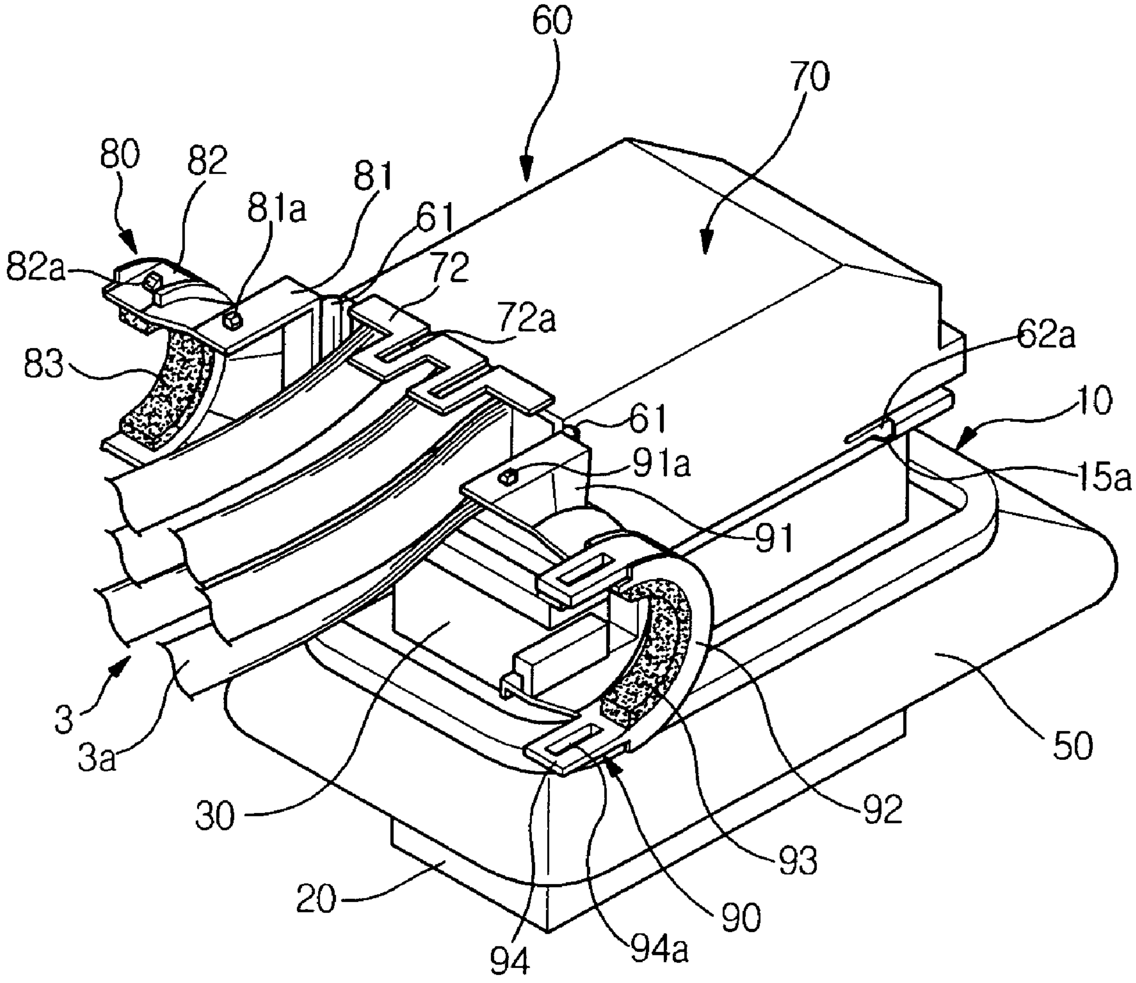
FIG. 11 is a perspective view illustrating the wire harness fixing device in accordance with another embodiment, showing a body of the cap member coupled to the housing.

The cap body 70 of the cap member 60 slidably engages the housing 10 and the electric lines 3*a* of the wire harness 3 extend through the through hole 11, as shown in FIG. 10, The housing-side tongue and groove joint 15 engages the first tongue and groove joint 62, and at the same time, the wire harness 3 is guided to the cap member 60 with the electric lines 3*a* extending through the open portion 71 of the cap body 70, as shown in FIG. 11. With the hinge couplers 80 and 90 open, the wire harness 3 can be easily withdrawn through the open portion 71. The cap body 70 is firmly secured to the housing 10 because the insertion protrusions 62*a* are latched to the insertion grooves 15*a*.

Figure 12:
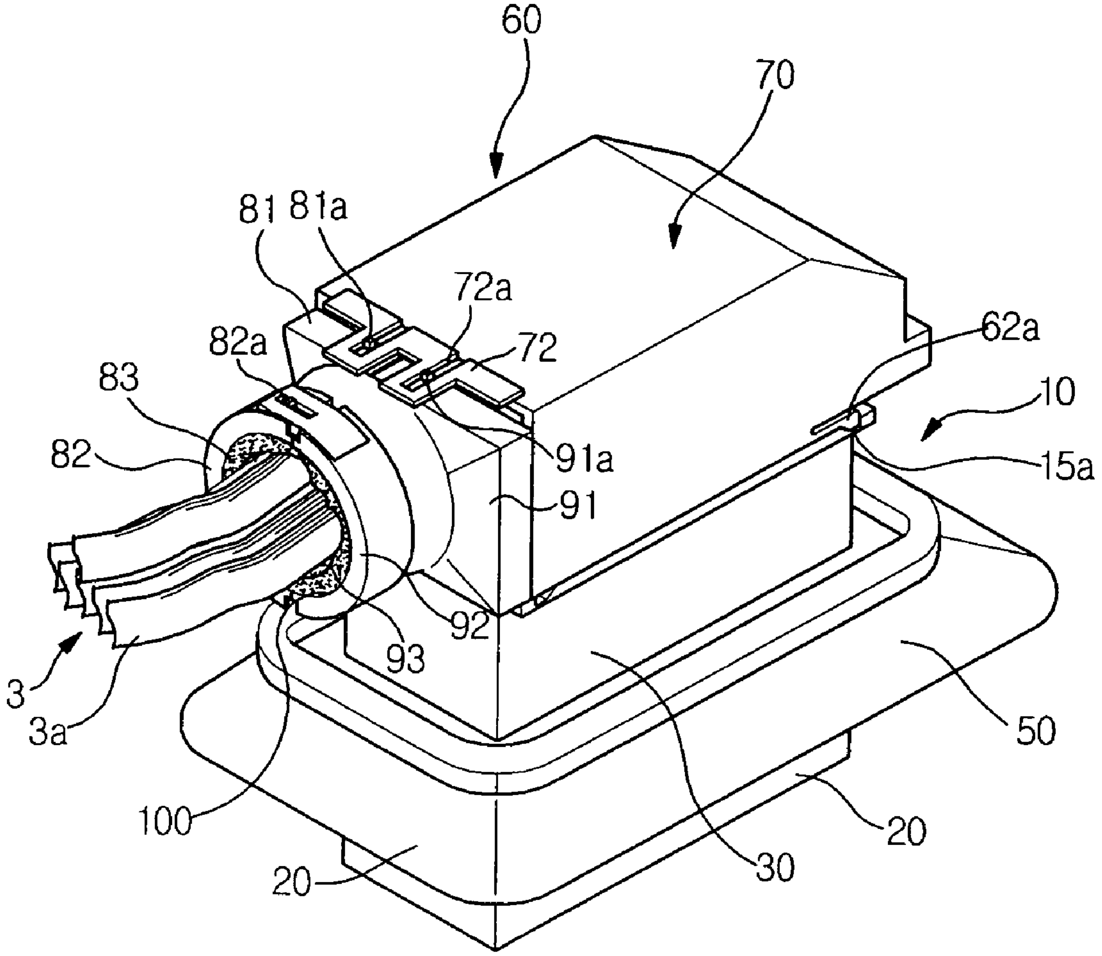
FIG. 12 is a perspective view of the wire harness fixing device in accordance with another embodiment, showing respective hinge couplers of the cap member pivoted in a closed position.

As shown in FIG. 12, when the hinge couplers 80 and 90 are pivoted towards the open portion 71, and closed the closing portions 81 and 91 of the respective hinge couplers 80 and 90 are latched to the first latching holes 72*a* so that the respective hinge couplers 80 and 90 are fixed to the cap body 70. At this time, the respective hinge couplers 80 and 90 are coupled to each other by latching the respective second latching protrusions 82*a* of the hinge coupler 80 to the second latching holes 94*a* formed in the second extensions 74 of the other hinge coupler 90. As a result, the withdrawal port 100 is formed by coupling the respective hinge couplers 80 and 90, and the lines 3*a* extend to the outside of the cap body 70 through the withdrawal port 100.

At this time, the second tongue and groove joint 63 formed on the hinge couplers 80 and 90 engages the housing-side tongue and groove joint 15 at the open portion 71 side to prevent the leakage of the foam insulation member through gaps between the cap member 60 and the housing 10, with the sealing members 83 and 93 being firmly sealed between the withdrawal port 100 and the wire harness 3.

Figure 13:
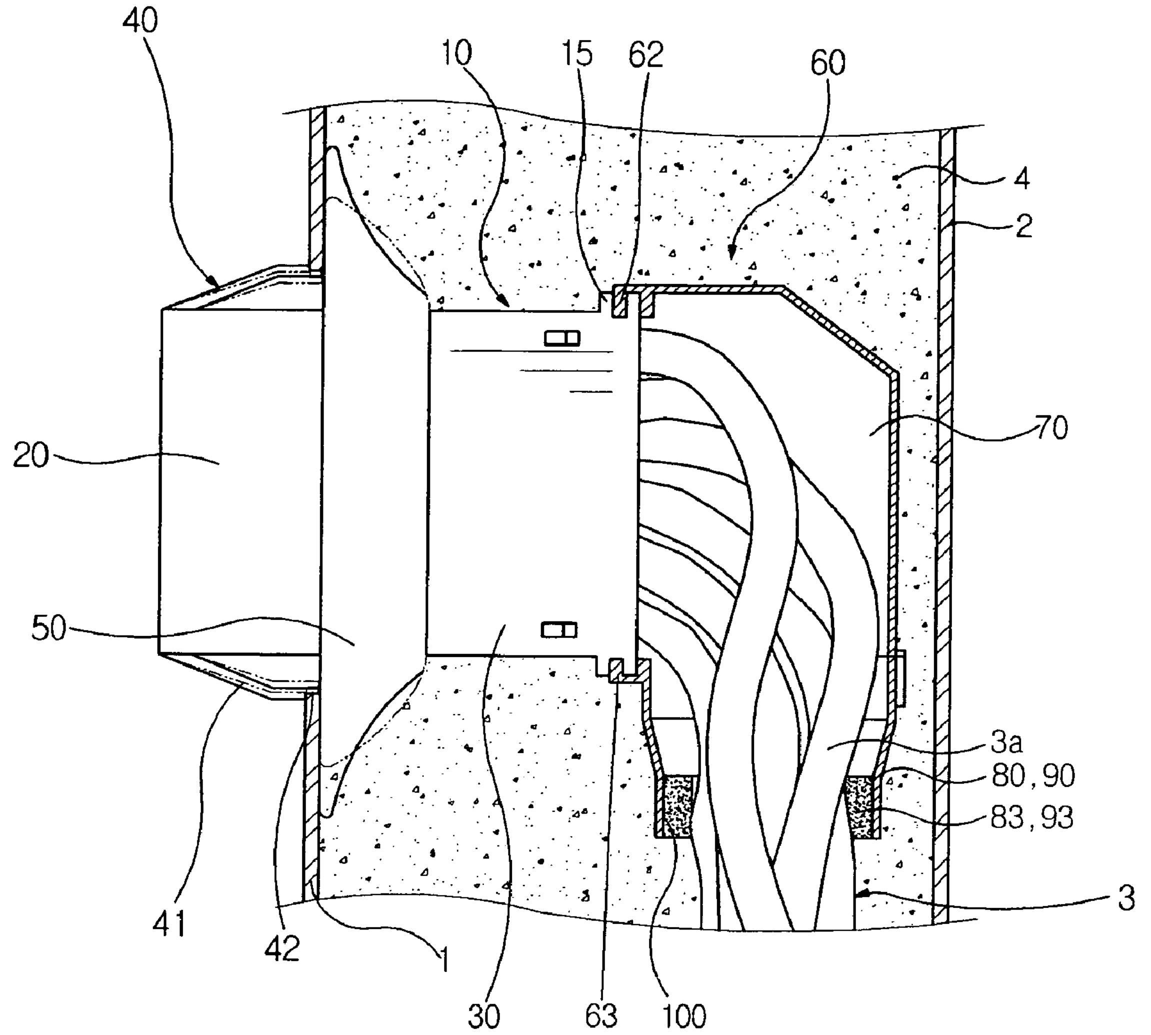
FIG. 13 is an elevational view of the wire harness fixing device in accordance with another embodiment, showing the foam insulation material filled between the inner and outer liners with the housing of the wire harness fixing device inserted into the fixing hole of the inner liner.

In addition, as shown in FIG. 13, when the foam insulation material 4 is filled between the inner and outer liners 1 and 2 with the wire harness fixing device installed in the fixing hole 1*a*, it is possible to effectively prevent the leakage of the foam insulation material 4 through gaps between the wire harness 3 and the though hole 11 of the housing 10 as well as gaps between the fixing hole 1*a* of the inner liner 1 and the housing 10, since the gaps between the housing 10 and the cap member 60 and the gaps between the withdrawal port 100 and the wire harness 3 are closed.

The wire harness fixing device of the present embodiment also comprises the cover 50 which can be integrally formed to the housing 10 so as to prevent the foam insulation material 4 from being leaked through the gaps between the housing 10 and the fixing hole 1*a* of the inner liner 1, which is the same function and effect of the cover of the above embodiment. Thus, further detailed description of the cover of the prevent embodiment will be omitted hereinafter.

As apparent from the above description, the cover 50 of the wire harness fixing device of the invention can be integrally formed to the housing to eliminate gaps therebetween by being brought into close contact with the inner surface 6 of the inner liner 1 to cover the fixing hole 1*a* via elastic deformation. Thus, leakage of the foam insulation material 4 between the inner and outer liners and of the refrigerator is substantially prevented, and the device is easily installed in the inner liner 1 of the refrigerator by the cover 50.

In addition, the cap member 60 of the wire harness fixing device of the invention covers the end of the housing 10 inside the inner liner 1. The pair of hinge couplers 80 and 90, which are hinged and coupled to form a withdrawal port 100 to enable easy withdrawal of the wire harness therethrough to the outside, effectively prevent the foam insulation material from being leaked through the space between the wire harness and the through hole 11 of the housing 10 configured to allow the wire harness to be inserted thereto when filling the foam insulation material 4 into the space between the inner and outer liners, and to allow easy withdrawal of the wire harness.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A wire harness fixing device for installing a wire harness in an inner liner of a refrigerator, comprising:

a housing including an insert part provided at one end of the housing and received in a fixing hole formed in the inner liner, and an interior part provided at another end of the housing within the inner liner, the housing having a housing-side tongue and groove joint formed on an outer edge of the end of the interior part;

a pair of latches extending from the insert part, the latches engaging an outer surface of the inner liner at the fixing hole when the insert part is inserted to the fixing hole;

a flexible cover integrally made of rubber and formed as one piece with the housing through injection molding covering the fixing hole, the cover elastically deforming in close contact with an inner surface of the inner liner at the fixing hole when the latches are engaged with the inner liner; and a cap member coupled at one end thereof to the interior part to cover the another end of the housing and having a withdrawal port formed at the other end for withdrawing the wire harness, the cap member having a hollow cap body communicating with an interior of the housing while being coupled at one end to the interior part, an open portion formed at one side of the cap body, a pair of hinge couplers hingably provided to the cap body at both sides of the open portion, respectively, such that the hinge couplers pivoted towards the open portion, and engage each other to define the withdrawal port therebetween, and a cap member-side tongue and grove joints formed on an inner edge of the one end of the cap member such that the housing-side tongue and groove joint engages with the cap member-side tongue and groove joints, wherein the cap member is coupled to the housing such that the end of the interior part is received in the one end of the cap member, and wherein the cap member-side tongue and groove joints comprise a first tongue and groove joint formed on the cap body, and a second tongue and groove joint formed on the hinge couplers.

2. The wire harness fixing device according to claim 1, wherein the cover extends radially at a predetermined angle from an outer surface of the interior part towards the insert part, and is tapered such that, as the cover approaches from the interior part to the insert part, a distance between an outer periphery of the cover and the outer surface of the housing gradually increases.

3. The wire harness fixing device according to claim 2, wherein each of the latches comprises a body, and a latching jaw formed at a distal end of the body such that the latching jaw is latched to the outer surface of the inner liner at the fixing hole, the latching jaw being positioned inside of the cover before the cover is elastically deformed.

4. The wire harness fixing device according to claim 2, wherein each of the latches comprises a body, and a latching jaw formed at a distal end of the body such that the latching jaw is latched to the outer surface of the inner liner at the fixing hole, and a distance between the latching jaw and a distal end of the cover being smaller than a thickness of the inner liner before the cover is elastically deformed.

5. The wire harness fixing device according to claim 1, wherein each of the latches includes a body and a latching jaw formed at a distal end of the body, the latching jaw including, a latching portion configured to abut the outer surface of the inner liner at the fixing hole, and a holding portion formed inside the latching portion and configured to abut the fixing hole.

6. The wire harness fixing device according to claim 1, wherein the hinge couplers and the cap body are integrally formed by injection molding, and the cap member further comprises narrow sections of a thin thickness formed between each hinge coupler and the body such that the hinge couplers are hinged at both sides of the open portion.

7. The wire harness fixing device according to claim 1, wherein the end of the interior part slides into the one end of the cap member such that the housing-side tongue and groove joint is coupled to the first tongue and groove joint through the open portion when the hinge couplers are pivoted away from the open portion, and the housing-side tongue and groove joint, and the first tongue and groove joint having insertion protrusions and insertion grooves formed thereon to engage with each other, respectively.

8. The wire harness fixing device according to claim 1, wherein each of the hinge couplers has a first latching protrusion formed thereon, and the cap body have a first latching hole formed thereon such that the hinge couplers are coupled to the cap body when the hinge couplers are pivoted towards the open portion, and each of the hinge couplers has a pair of second latching protrusions, and a pair of second latching holes such that the pair of second latching protrusions are coupled to the pair of second latching holes when the hinge couplers are pivoted towards the open portion.

9. The wire harness fixing device according to claim 1, further comprising: a sealing member on an inner surface of each hinge coupler at the withdrawal port to enhance the closing force between the withdrawal port and the wire harness.

* * * * *